April 13, 1965 B. K. HALLAMORE 3,177,768

RECORDING APPARATUS

Filed June 5, 1961 3 Sheets-Sheet 1

INVENTOR.
BARRY K. HALLAMORE
BY
Christie, Parker & Hale
ATTORNEYS.

April 13, 1965 B. K. HALLAMORE 3,177,768
RECORDING APPARATUS
Filed June 5, 1961 3 Sheets-Sheet 2
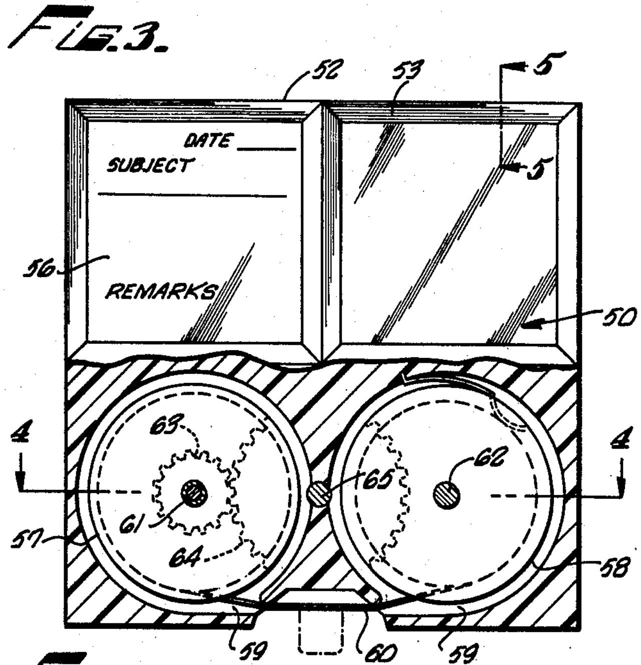
FIG. 5.
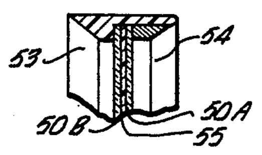
FIG. 6.
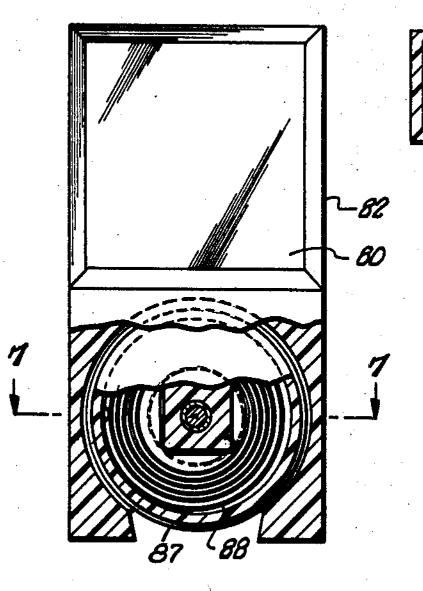
FIG. 4.
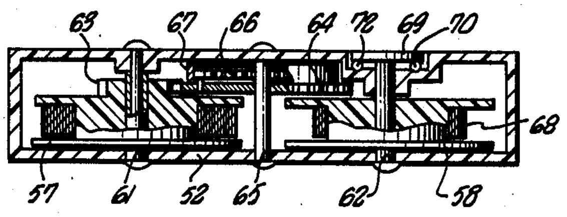
FIG. 11.
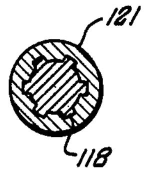
FIG. 7.
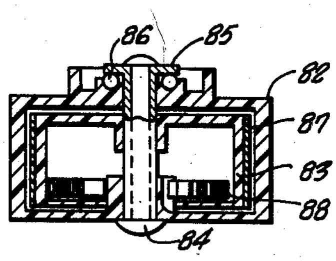
INVENTOR.
BARRY K. HALLAMORE
BY Christie, Parker & Hale
ATTORNEYS.

April 13, 1965 B. K. HALLAMORE 3,177,768

RECORDING APPARATUS

Filed June 5, 1961 3 Sheets-Sheet 3

INVENTOR.
BARRY K. HALLAMORE
BY Christie Parker & Hale
ATTORNEYS.

United States Patent Office 3,177,768
Patented Apr. 13, 1965

3,177,768
RECORDING APPARATUS

Barry K. Hallamore, 1461 El Mirador Ave., Long Beach 15, Calif.

Filed June 5, 1961, Ser. No. 114,944
12 Claims. (Cl. 88—28)

The present invention relates to recording apparatus.

This application is a continuation in part of my application Serial No. 725,313, filed March 31, 1958, now abandoned.

Many types of recording apparatus have heretofore been used for recording information such as audio signals. One of the most practical and convenient types of apparatus for recording audio signals utilizes magnetic recording tape. In such apparatus audio signals are recorded on a magnetic tape which is driven past a transducer at a constant speed. A pair of reels are used to store the magnetic tape. The tape is generally threaded through the tape driving mechanism and inserted onto an empty reel before each recording and playback operation. The time required for rethreading the tape renders the use of such conventional magnetic tape apparatus impractical for recording short conversations and the like on a single tape. The recording of many conversations on a single tape presents problems of locating a single conversation. Also the mechanical mechanism utilized to drive the tape past the transducer at a constant speed is generally complex and expensive.

The above disadvantages of the prior recording apparatus for recording short conversations and the like are overcome by the present invention which provides a recording apparatus that is convenient to use, relatively inexpensive and that does not require a constant speed drive to provide a constant tape speed and its attendant complex mechanism. In accordance with the present invention a cylindrical transport member is rotatably mounted on a frame. A recording medium such as an elongated strip of magnetic tape is connected to the transport member so that the recording medium is moved relative to the frame when the transport member is rotated relative to the frame. Spring means are coupled between the frame and the transport member for biasing the transport member in a preselected direction of rotation relative to the frame to automatically reset the transport member and the recording medium after each recording and playback operation so that the apparatus is ready for the next operation.

In the preferred embodiment a pair of spaced reels are rotatably mounted on the frame and a length of magnetic tape is connected to each of the reels so that the tape is wound on one of the reels and unwound from the other reel when said one reel is rotated in a predetermined direction to record information on the tape or play back information previously stored on the tape. A spring is connected between the other reel and the frame for biasing the other reel in a direction to rewind the tape thereon. Information may be conveniently stored on the tape by driving said one reel by a constant speed motor and placing a suitable transducer adjacent a portion of the tape extending between the two reels. At the end of the recording operation the spring automatically rewinds the tape on the other reel so that the recording apparatus is ready for use to play back the recorded information. In the playback operation a constant speed motor is again utilized to drive said one reel in the predetermined direction (preferably at the same speed which was used for the recording operation) and a transducer is again placed adjacent the tape so that the tape is moved relative to the transducer.

In another embodiment of the present invention a unitary record of a visual image and sound recording medium is provided to permit the display of the visual image to be accompanied by an appropriate commentary of the visual image. This provides a compact and versatile record unit in which the visual image and/or the audio message may be readily changed. Many of such record units may be successively exhibited and the order of presentation may be easily changed.

The invention is described in more detail in reference to the accompanying drawings in which:

FIG. 3 is a plan view partially broken away of another embodiment of the present invention;

FIG. 4 is a horizontal sectional view taken along line 4—4 of FIG. 3;

FIG. 5 is a partial sectional view taken along line 5—5 of FIG. 3;

FIG. 6 is a plan view partially broken away of another embodiment of the present invention;

FIG. 7 is a horizontal sectional view taken along line 7—7 of FIG. 6;

FIG. 11 is a vertical sectional view taken along line 11—11 of FIG. 10.

Figure 1:
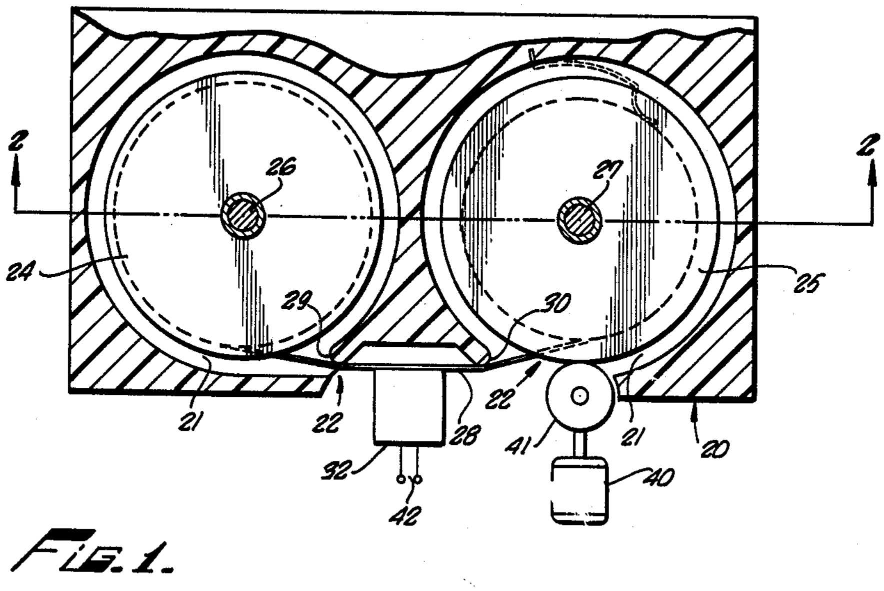
FIG. 1 is a plan view partially broken away of a recording apparatus in accordance with the present invention including a block diagram of a record and playback means for utilizing the same.
Figure 2:
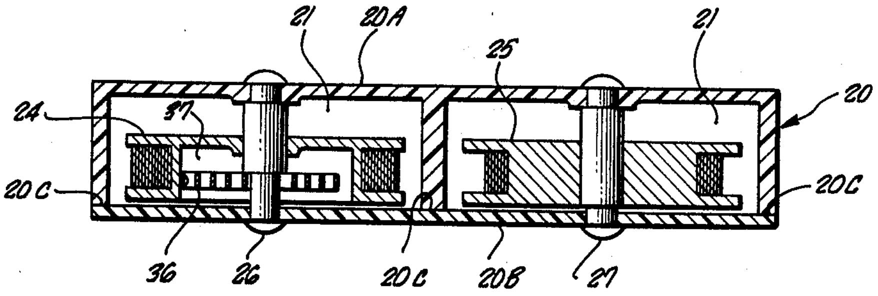
FIG. 2 is a horizontal sectional view taken along line 2—2 of FIG. 1.

Referring now to the drawings and particularly to FIGS. 1 and 2 there is shown, a frame or mounting member indicated generally at 20. The frame 20 includes a rear portion 20A and a front portion 20B which may be formed of a suitable material such as plastic joined along the inner edge 20C of the front portion 20B by gluing, bonding, etc. The frame member 20 defines a pair of cavities 21 and a pair of openings 22 communicating with the respective cavities 21 on one side of the frame as shown in FIG. 1. First and second reels 24 and 25 are disposed within the respective cavities and rotatably mounted on the frame by mounting studs 26 and 27, respectively. An elongated recording medium such as a length of magnetic tape 28 has its ends connected to the reels 24 and 25 so that the tape is wound on the reel 25 and unwound from the reel 24 when the reel 25 is rotated in a counter clockwise direction. The frame 20 includes a pair of guide shoulders 29 and 30 forming one side of the respective openings 22. The guide shoulders 29 and 30 protrude into the path of the tape 28 extending between the reels to guide the tape along a straight path to permit a transducer 32 to record signals on the tape 28 or play back signals previously recorded thereon in a well known manner. Energy storage means such as a clock spring 36 is disposed within an annular recess 37 of the reel 24 and has one of its ends connected to the stud 26, and its other end connected to the reel 24 for biasing the reel 24 in a clockwise direction to rewind the tape thereon.

A suitable constant speed motor 40 may be coupled to the rim of the reel 25 by means of an engaging disc 41 for rotating the reel 25 in a counter-clockwise direction at a constant speed. The transducer 32 is positioned adjacent the tape 28 between the guide shoulders 29 and 30 for recording signals on the tape 28 when the reel 25 is driven by the motor 40 or for playing back signals previously recorded on the tape 28. The transducer 32 includes an output or input circuit 42 which may be coupled through a suitable amplifier to a microphone or loud speaker (not shown) depending upon whether it is desired to record or play back the signals on the tape 28.

To record information such as audio or sound signals on the tape 28 it is only necessary to drive the reel 25 by suitable means such as the constant speed motor 40 and apply suitable electrical signals to the circuit 42 of the transducer 32 in a well known manner. At the end of the recording operation the engaging disc 40 is removed from engagement with reel 25 by suitable means (not shown) and the spring 36 which has been stressed during the recording operation rewinds the magnetic tape on the reel 24 so that the tape is now in position for playing back the recorded signals. To play back the recorded signals it is only necessary to drive the reel 25 preferably at the same speed which was used in the recording operation and obtain an output signal from the transducer 32.

It will be noted that the speed of the tape relative to the transducer 32 will vary depending upon the number of turns of tape that are wound on the reel 25. The variation in tape speed during the recording and reproducing operations, however, has little if any effect on the fidelity of the reproduced signals since the speed of the tape is the same when any particular signal is being recorded and reproduced.

Referring now to FIGS. 3, 4 there is shown a unitary record of a visual image and a sound recording medium. A transparent window 50 formed by a pair of glass plates 50A and 50B (see FIG. 5) is secured to a frame 52 by means of peripheral shoulders 53 and 54. The shoulder 54 may be removed so that a suitable transparent image such as a photographic slide 55 may be placed between the glass plates 50A and 50B as shown in FIG. 5. An identification sheet 56 is also supported on the frame 52 and positioned beside the window 50 to receive markings to indicate the information carried by the record. A pair of reels 57 and 58 are rotatably supported on the frame 52 and disposed within a pair of cavities 59 formed in the lower portion of the frame 52 as shown. A length of magnetic tape 60 is connected between the reels 57 and 58. Mounting studs 61 and 62 rotatably carry the reels 57 and 58 which are spaced apart in the same plane. A gear wheel 63 is coaxially mounted on the stud 61 with the reel 57 and engages a gear wheel 64 which is rotatably mounted on the frame 52 by means of a shaft 65. A clock spring 66 is connected between the rotatable shaft 65 and a stationary spring chamber 67 which is rigidly connected to the frame 52 for biasing the reel 57 in a counter clockwise direction to rewind tape thereon. A clutch plate 69 is connected to the reel 58 to rotate therewith and a thrust bearing 70 is coupled between the clutch plate 69 and the frame 52 as shown to permit the clutch plate to rotate freely with respect to the frame. When the clutch plate 69 is driven the magnetic tape is unwound from the reel 57 and wound on the reel 58. This action stresses or winds up the spring 66 which rewinds the tape onto the reel 57 when the clutch plate 69 is released.

Referring now to FIGS. 6 and 7, there is shown another embodiment of a recording unit which includes a window 80 for receiving a transparent visual image positioned within a frame 82. Positioned below the window 80 in the frame 82 is a drum or transport member 83 rotatably mounted by means of shaft 84 on the frame 82. A clutch plate 85 is rigidly connected to the drum 83 for rotation therewith. A thrust bearing 86 is positioned between the clutch plate 85 and the frame 82 as shown. A recording medium 87 such as a length of magnetic tape is secured to the outer periphery of the drum 83 for rotation therewith. A clock spring 88 is connected between the drum 83 and the frame 82 to bias the drum in a predetermined direction of rotation to reset the recording medium after each playback and recording operation.

To record a signal on the recording medium 87 it is only necessary to drive the drum 83 by means of a constant speed motor (not shown) coupled to the clutch plate 85 and position a suitable transducer (not shown) adjacent the outer periphery of the drum 83 to apply recording signals such as magnetic signals to the recording medium 87. Where a magnetic recording medium is used the transducer positioning mechanism may be arranged to move the transducer laterally across the tape to record signals in a spiral path on the recording medium 87.

Figures 8, 9, 10:
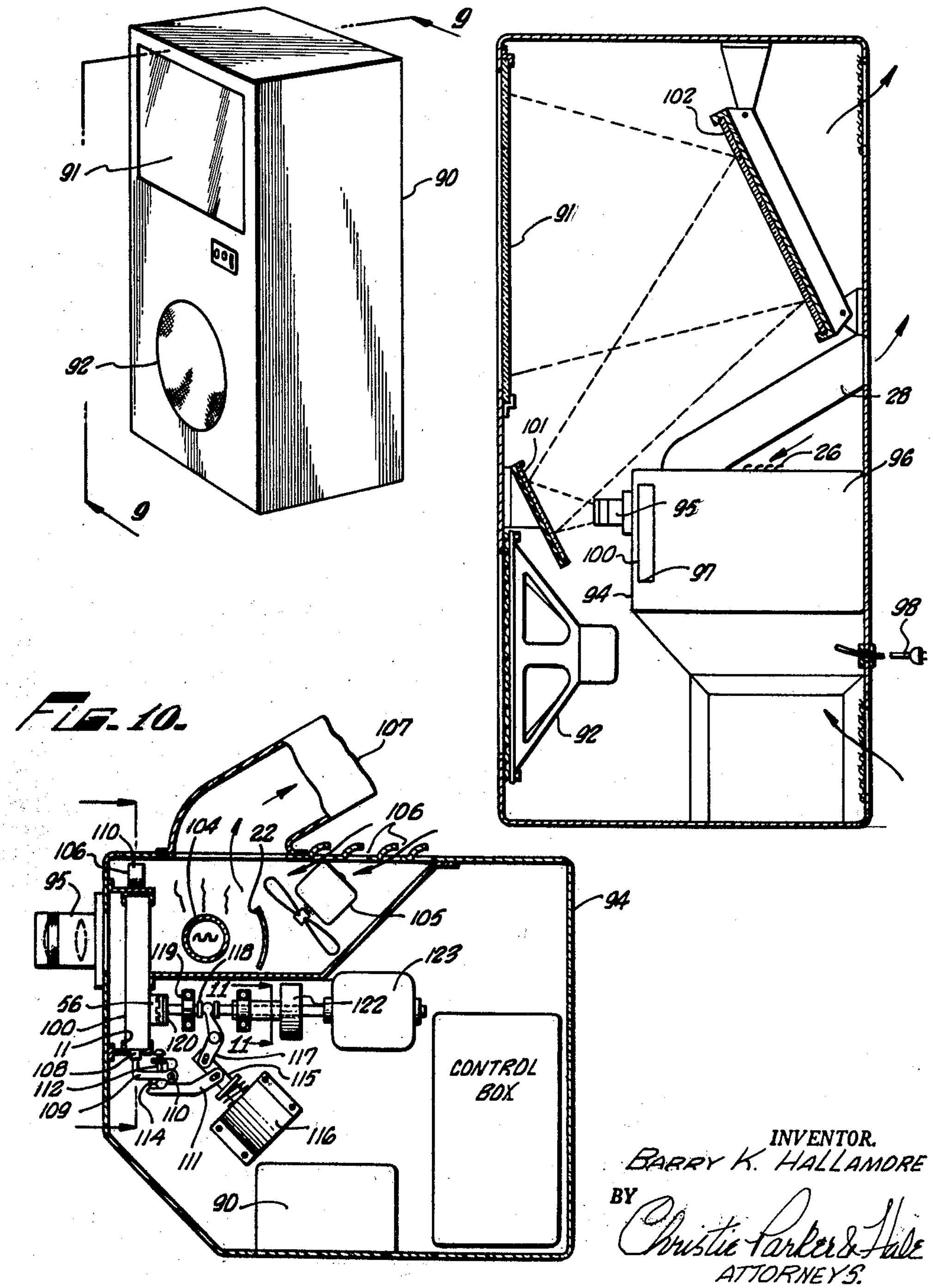
FIG. 8 is a perspective view of an audio visual system for utilizing the record unit of FIG. 3.
FIG. 9 is a horizontal sectional view taken along line 9—9 of FIG. 8.
FIG. 10 is a partial sectional view of a portion of the apparatus of FIG. 8.

In FIGS. 8, 9 and 10 there is illustrated one type of apparatus for reproducing the visual and audio signals recorded on the record unit of FIGS. 3 and 4. A cabinet 90 is provided for mounting a viewing screen 91 and a loud speaker 92. A housing 94 is positioned within the cabinet 90 as shown in FIG. 9. The housing 94 encloses a projection apparatus 95 and an automatic changer unit 96 which serves to insert and remove audio visual record units from a display receptacle 97. The changer unit 96 may be constructed in accordance with various well known plans of automatic slide changers and therefore will not be considered here in detail. The visual image of the record unit 100 (similar to the apparatus of FIGS. 3 and 4) which is placed in the display receptacle 97 is projected from the projector apparatus 95 onto a mirror 101 to be reflected to a mirror 102 which in turn reflects the image upon the viewing screen 91. The viewing screen 91 is formed of light transmissive material so that the image appears on the external surface of the screen.

Referring now to FIG. 10 there is shown an apparatus for reproducing the sound recording upon each of the individual record units and for projecting the visual image thereof. A lamp 104 provides the necessary illumination of projection for the optical projection apparatus 95. The lamp 104 is cooled by air which is circulated by means of a blower 105, positioned to draw air into the enclosure 94 through louvres or vents 106 and expel air through an air duct 107.

During the interval when the visual image of the record unit 100 is being projected, sound signals are sensed from the record unit 100 and converted into audible sound by the speaker 92. A transducer 108 is mounted upon an arm 109 which is pivotally supported on a stud 110 which also supports an adjustable connecting link 111. The arm 109 is engaged on one side by a set screw 112 carried by the link 111 and on the other side by spring 114 mounted between the arm 109 and the link 111. As a result, the arm 109 is yieldably-mounted relative to the link 111 over a limited distance. The link 111 is pivotally connected to an armature 115 of a solenoid coil 116. The position of the transducer 108 can be varied by changing the position of the set screw 112.

The armature 115 of the solenoid coil 116 is also pivotally connected to a link 117, pivotally mounted at its center and positioned to engage a splined shaft 118. The splined shaft 118 is supported by a bearing 119 and carries a clutch plate 120. The shaft 118 is telescopically received by a shaft 121 in such a manner as to slide freely therein, while providing a rotatable coupling as shown more particularly in FIG. 11. The shaft 121 carries a fly wheel 122 and is driven by a suitable electric motor 123. Upon energization of the solenoid coil 116, the link 111 is moved to bring the transducer 108 into firm engagement with the recording medium such as the magnetic tape 68 of the apparatus of FIGS. 3 and 4. The coil 116 also moves the clutch plate 120 into contact with the clutch plate driving one of the reels such as the clutch plate 69 of FIG. 3. As the magnetic tape is moved relative to the transducer 108, electrical signals may be either sensed from or recorded on the tape.

Suitable electrical apparatus (not shown) may be utilized to control the operation of the motor 123, the solenoid coil 116, the lamp 104 and the blower 105 to display the visual image and translate the signals recorded on the recording medium into audible sounds from each record unit 100. One such apparatus is described and claimed in my copending application referred to above.

There has thus been disclosed a simple, inexpensive and compact recording apparatus for providing a record of desired information such as audio signals or audio signals and visual images.

I claim:

1. Recording apparatus comprising a stationary mounting member, a cylindrical transport member rotatably mounted on the mounting member, a recording medium connected to the transport member so that the recording medium is moved relative to the mounting member when the transport member is rotated relative to the mounting member, and spring means coupled between the mounting member and the transport member for biasing the transport member in a preselected direction of rotation relative to the mounting member to return the transport member to a preselected position relative to the mounting member after each recording and playback operation.

2. Recording apparatus comprising a mounting member, a pair of spaced reels rotatably mounted on the mounting member, an elongated recording medium connected to each of the reels so that the recording medium is wound on one of the reels and unwound from the other reel when said one reel is rotated in a predetermined direction, and spring means coupled between the other reel and the mounting member for biasing the other reel in a direction to rewind the recording medium thereon.

3. Recording apparatus comprising a frame, defining at least one enclosed cavity therein and an opening on one side of the frame communicating with the cavity, a pair of spaced reels rotatably mounted within the cavity in the frame, a magnetic tape connected between each of the reels so that the tape is wound on one of the reels and unwound from the other reel when one said reel is rotated in a predetermined direction, and spring means connected between the other reel and the frame for biasing the other reel in a direction to rewind the tape thereon whereby the tape is automatically reset after each recording and playback operation.

4. The combination defining claim 3 wherein the frame includes guide shoulders individually disposed adjacent each of the reels for guiding the tape along a straight path between a portion of the distance between the reels.

5. The combination defined in claim 4 wherein the spring means is a clock spring and further including a shaft rigidly connected to said one reel, the shaft having at least one end extending on the outside of the frame and being rotatably mounted in the frame when the shaft is rotated for rotating said one reel relative to the frame.

6. Recording apparatus comprising a frame defining a pair of cavities therein and at least one opening individually communicating with each of the cavities on one side of the frame, a reel disposed within each of the cavities and rotatably mounted on the frame, a magnetic tape connected to each of the reels and extending through the openings in the frame so that the tape is wound on one of the reels and unwound from the other reel when said one reel is rotated in a predetermined direction, the frame including a pair of spaced shoulders protruding into the path of the tape to guide the tape extending between the reels in a straight path for a predetermined distance and a spring connected between the other reel and the frame for biasing the other reel in a direction to rewind the tape thereon whereby the tape is automatically reset after each recording and playback operation.

7. The combination defined in claim 6 including means adapted to receive and support a transparent visual image on the frame.

8. An audio-visual record comprising mounting means including support means adapted to receive and support a slide carrying a visual image; sound recording means mounted upon said mounting means, said sound recording means having a sound track associated with said visual image and being mounted so as to allow said sound track to be moved relative to said mounting means; and spring means connected to said mounting means and to said sound recording means so as to be stressed by movement of said recording track to a preselected position relative to said mounting means after each recording and playback operation, for resetting said track.

9. An audio-visual record unit comprising a mounting member adapted to receive and support a slide carrying a visual image, a pair of spaced reels rotatably mounted on the mounting member, a length of magnetic tape connected at each end to the reels so that the tape is wound on one of the reels and unwound from the other reel when said one reel is rotated in a predetermined direction and spring means coupled between the other reel and the mounting member for biasing the other reel in a direction to rewind the tape thereon whereby the tape is automatically reset after each recording and playback operation.

10. Recording apparatus comprising a support member, a drum rotatably mounted on the support member, the drum including a recording medium on the outer periphery thereof, and spring means coupled between the drum and the support member for biasing the drum in a preselected direction of rotation relative to the support member to return the drum to a preselected position relative to the support member after each recording and playback operation.

11. Recording apparatus comprising a support member defining an enclosed space therein and an opening communicating with the space on one side of the support member, a drum having a recording medium on the outer periphery thereof disposed within the space and rotatably mounted in the support member, and spring means connected between the support member and the drum for biasing the drum in one direction of rotation relative to the support member to return the drum to a preselected position relative to the support member after each recording and playback operation.

12. The combination as defined in claim 11 wherein the spring means comprises a helical spring disposed within the drum and connected at one end to the drum and connected at the other end to the support member and further including a shaft connected to the drum and extending outside of the support member for rotating the drum relative to the support member when the shaft is rotated.

References Cited in the file of this patent

UNITED STATES PATENTS

| | | |
|---|---|---|
| 688,175 | Houke | Dec. 3, 1901 |
| 2,074,298 | Martin | Mar. 16, 1937 |
| 2,507,385 | Schrader | May 9, 1950 |
| 2,853,923 | Daniel | Sept. 30, 1958 |
| 2,961,922 | Schwartz et al. | Nov. 19, 1960 |
| 3,075,717 | Kingston | Jan. 23, 1963 |